July 30, 1963 — I. NAXON — 3,099,737
INSTANTANEOUS ELECTRIC WATER HEATERS
Filed March 10, 1960

*Irving Naxon*
INVENTOR.

BY *Stevens & Batchelder*
Attorneys.

United States Patent Office 3,099,737
Patented July 30, 1963

3,099,737
INSTANTANEOUS ELECTRIC WATER HEATERS
Irving Naxon, 3003 W. Jarvis Ave., Chicago 45, Ill.
Filed Mar. 10, 1960, Ser. No. 14,142
2 Claims. (Cl. 219—38)

My invention relates to electric water heaters, and more particularly to those which are designated as instantaneous. While this type of heater is considered as activated momentarily by the demand for hot water, the fact is that it usually employs a storage factor, such as a tank, for the application or immersion of its heating unit. If this is not the case it of course requires that the heating unit be well insulated from the liquid to prevent a ground or short-circuit or leakage of current by electrolysis. It follows, therefore, that the electrical insulation is generally a thermal insulation and therefore a bar to the passage of heat from the heating element, so that the thermal efficiency of the heater is reduced. Further, the standing of hot water in a tank, or its slow passage in conduits of conventional capacity, favors deposits of scale which will coat the surfaces in contact with the hot water, cause loss of heat through the latter, and eventually retard the circulation of water in the heater.

It is one object of the present invention to depart from the deficiencies just outlined by providing an electric water heater of the fast or instantaneous type which does not employ an immersion type of heating unit, and therefore does not require a tank, or insulation which is so thick or thorough electrically that it also functions as thermal insulation to reduce the working efficiency or rate of heat transfer between the heated wire and the water.

A further object is to provide a heater which is responsive to demand—when the dispensing faucet is opened—to heat only the amount of water required.

Another object is to provide a heating unit contacted by the water intimately for the maximum absorption of heat from the unit, and means causing the water to move rapidly in a narrow stream, in order to render the resulting water volume the same as from a stream moving slowly in a conduit of greater cross-section.

A still further object is to employ means exposing the heating element or wire directly to the water stream, and provide an environment for the latter which will cause it to assume such a high electrical resistance that only a comparatively small fraction of the current going through the heating unit will penetrate the water column, rendering the factor of electrolysis and a possible electrical hazard negligible.

An additional object is to construct the heater so compactly that it occupies only a small space along the course of the water supply facility.

A better understanding of the invention may be had by reference to the accompanying drawing, in which—

Figure 1:
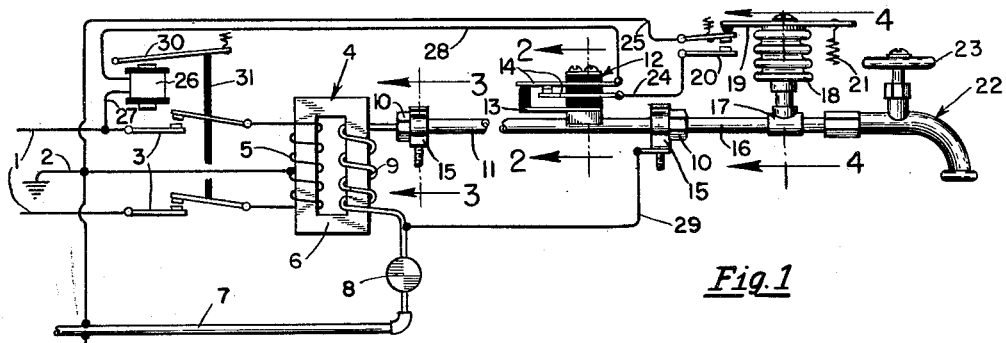
FIG. 1 is a schematic view of the heater, with the water heating unit and some of its associate parts proportionally magnified for purposes of clarity.
Figure 2:
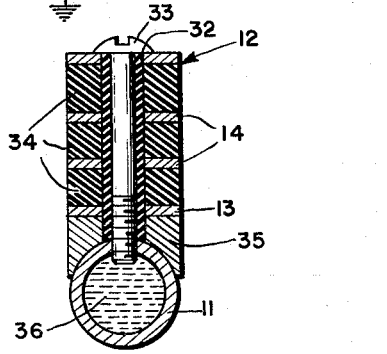
FIGS. 2 to 4 are magnified sections on the lines 2—2 to 4—4 of FIG. 1.
Figure 3:
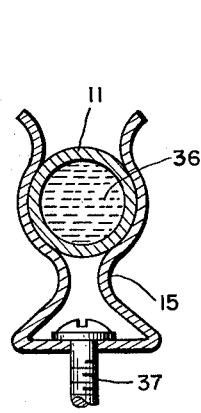
Figure 4:
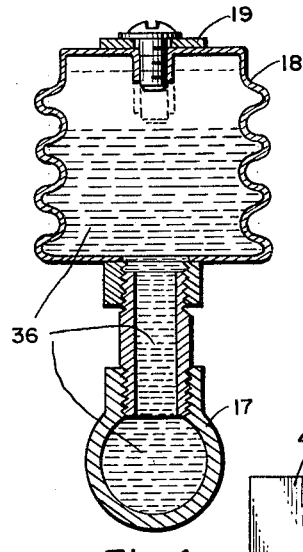

Referring specifically to the drawing, FIG. 1 shows the electrical circuit involved in the operation of the present heater, the current supply being a conventional 115–230 volt, 3-wire supply represented by service leads 1 and a ground line 2. The service leads have interposed switches 3, and join to form the primary winding of a voltage step-down transformer 4, whose core is represented at 6.

The ground line 2 is in engagement with the water supply pipe 7, which incorporates a regulator 8. The latter, in turn, feeds water through a tubular low-resistance conductor made of copper or aluminum and wrapped as a coil 9 to form the secondary winding of the transformer 4.

Spaced couplings 10 are shown in the middle portion of FIG. 1, the one on the left-hand side receiving the pipe coil 9. The water outlet pipe 16 leads from the other coupling 10, and terminates with the dispensing faucet 22. The couplings have tubular stems 10a seating removably in spring clips 15, these being secured by screws 37 to a base or other suitable support (not shown) in order to fix the spacing and alinement of the clips 15.

The coupling stems 10a receive the end portions of a thin-walled tube 11 made of Nichrome or similar resistance material which combines strength with high electrical resistance. The tube is shown magnified in FIG. 1 for purposes of clarity and in relation to associated parts. Actually, the bore and wall thickness of the tube and the liquid, as well as the current-carrying capacity thereof, are considerably less than the capacity of the coil 9, the principal effect of this relation being to increase the velocity of the liquid flow in, as well as to increase the electrical resistance of, the tube 11.

Connected to the secondary winding 9 as shown, the tube 11 or any metallic content thereof may be considered as the resistor or heating element for water received through the tubular winding, since the latter generates the requisite wattage at a comparatively low voltage as the voltage in the transformer is stepped down. Also, the tube is so considered—instead of the winding—because the tube is independent, removable for replacement, and in the open. It is thus also usable for actuating a thermostatic control 12.

The motivating element for the flow control 12 is a bellows 18 communicating with the water outlet pipe 16, the water pressure in the latter keeping the bellows extended as long as the faucet 22 is closed. When the latter is opened, the relaxation of the bellows causes it to close a switch 20 which completes an electrical circuit through one service lead 1, a branch 27, a relay coil 26, a conductor 28, a thermostat switch 14, a return conductor 24, the switch 20, a return conductor 25, and the grounding water supply pipe 7 as well as the grounded neutral line 2. Now the armature 30 of the relay acts through insulation plungers 31 to close the switches 3 interposed in the service leads 1, causing these to close the current supply to the primary winding 5 of the transformer 4. The operation of the latter to heat the water to a prescribed temperature acts on the thermostat switch 14 to open the same when such temperature is exceeded, this action being caused by the close thermal relation of the bi-metal of the thermostat 13 with the tube 11. The original circuit is thus broken until the temperature of the water falls, when the process is repeated.

Figure 6:
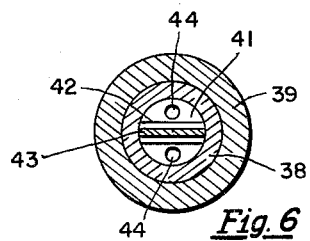
FIG. 6 is a cross-section on the line 6—6 of FIG. 5.
Figure 5:
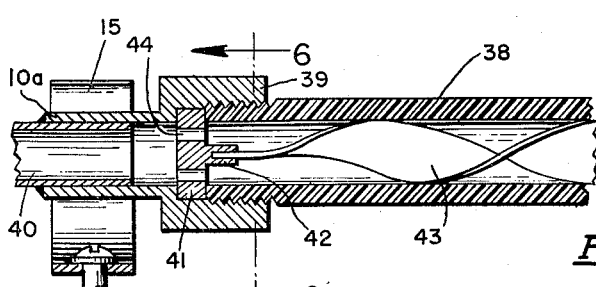
FIG. 5 is a magnified longitudinal section of a modified heating unit.
Figure 5:
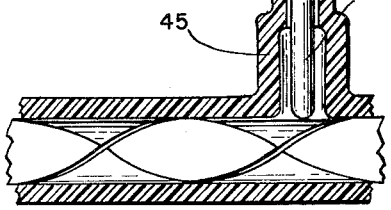
Figure 7:
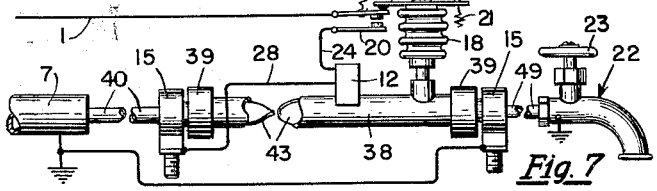
FIG. 7 is a view similar to FIG. 1, showing the modified heating element incorporated in the heater.

The modification of FIGS. 5 to 7 retains the clips 15, and employs couplings 39 similar to the couplings 10, but substitutes a tube 38 of insulation for the metallic tube 11 previously employed. However, a metallic plug 41 is lodged in each coupling, the plug having perforations 44 and an inwardly directed receptacle 42 for the end portions of a spirally twisted ribbon 43 of resistance wire. The inlet pipe to the tube 38 is indicated at 40, and the outlet pipe to the faucet at 49. The thermostat 12 is contained in a jacket 46 and supported in a branch 45 of the tube 38 with a temperature-sensing stem of the thermostat shown at 47 in FIG. 5. In the modified embodiment, the resistance ribbon may be used alone, or in conjunction with the heating transformer 4, to constitute the tube 38 a water heating unit. The ribbon, by its large flat surfaces, not only makes maximum heating contact with the water surrounding it, but the twisted construction of the ribbon, by presenting a degree of resistance to the circulation of the water stream, causes the water to absorb more heat from the wire than would be the case if the latter were straight. Further, it is noted that the ribbon 43 spans the tube 38 cross-sectionally. Thus, all water running through the tube engages the heating ribbon, adding to the efficiency thereof.

It will now be apparent that the novel heater contains a number of advantageous features. Thus, it imparts heat to water while it circulates, dispensing with the need of a storage tank. Further, the heating unit confines the water in a narrow, but elongated column where it gains maximum heat by direct contact with the heating medium, and gains volume by its rapid movement to the dispensing zone. Further, the thus-increased movement of the water column prevents the deposit of any scale-forming substance in the heating tube. Further, the inclusion of the water-heating tube in the transformer secondary circuit does not by virtue of the isolating effect of the transformer present a danger of electrical shock nor an appreciable leakage of current by electrolysis for the reason that the low voltage from the transformer secondary reduces the resultant current to a tiny fraction of that in the heating element. Thus, I have found it highly desirable to make the electrical resistance of the water column in the heating tube in excess of 20,000 ohms, so that a high ratio is created between the resistance of the heating element and that of the water column per se, and that less than .5% of the amount of current going through the metallic heating unit can possibly go through the water column extending in parallel therewith. Thus, the question of electrolysis by the leakage current through the water has been made negligible. I have found that in a conventional tap water system, a column of water ¼ inch in diameter and three feet long is found to possess an electrical resistance in excess of 20,000 ohms. Should the instant heater include such a column, the conductivity of the water—by reason of minerals and other foreign matter—would present a 20,000 ohm resistance. Now, should a 100-volt potential be imposed directly across the heater element and passed through the tubular or spiral heating unit, while the resistance of the heating element is assumed to be 10 ohms, the current going through such element would be 10 amperes, whereas that leaking through the water itself would be only 1/200 of 1 ampere, proving that the instant, direct-contact heating unit does not charge the water column with any appreciable amount of electric current. Finally, it is apparent that the novel heaters may be grouped or extended compactly along the course of the water pipe, whereby they occupy a minimum of space.

While a bellows-controlled switch is illustrated to initiate current flow upon opening of the faucet, a pressure-operated diaphragm or a Bourdon tube (a blind curved elastic tube oval in section) may be substituted for the bellows. Further, and with particular reference to FIG. 7, where the unit is fed current directly from one of the power lines 1, it is to be noted that all danger of exposing the user to electrical shock is completely eliminated because of these following additional reasons. First, the faucet is connected to ground to protect the user, but in addition, a substantial length of pipe 49, made of small bore plastic or other insulating material, is inserted between clip 15 nearest the faucet, notwithstanding the fact that the latter clip is safeguarded by an independent ground connection. Most important, a similar small-bore high resistance insulating tube 40 is inserted between the grounded water pipe 7 and its nearest clip 15, the latter being at full line potential when the thermostat and pressure-switch contacts are closed. Since the bore in the tube 40 is small compared to that of the water pipe 7 and the length of the tube can be made substantial, the leakage current trickling back from the line and to ground through this high-resistance water column is rendered negligible.

It is to be noted that where a step-down transformer is employed for electrical isolation the tubular water-heater 11 may be kept relatively short because of the lower voltage applied to its ends; however, where my invention is utilized directly across the line, the insulating tube 38 and accompanying resistance wire 43 are extended proportionately longer for a given wattage in order to accommodate the higher voltage. Likewise, as such higher voltages are used, the isolating tubes, such as indicated at 49 and particularly at 40, are made proportionately longer in order that the water columns therein attain the requisite high resistance desirable to minimize the leakage currents heretofore referred to.

Conventional fuse-type clips 15 are employed in connection with either the Nichrome (or equivalent material) tube heater 11 or the insulating type tube 38 in such a manner that, by the provision of metal end caps, these heaters are rendered quickly detachably insertible into the system, thus minimizing interruptions during use in the event of a heater failure.

I claim:

1. In an electric water heater, a water supply source, an electrical supply source, both sources possessing a common electrical ground, a water outlet, a section of water-conveying tubing disposed between said water supply source and outlet for heating the water passing through said section, the latter being made of water-pressure resisting electrical insulating material and threaded at the ends, plugs opposite the latter and formed with water passages, an electric heater in electrical connection with said electrical supply source comprising a twisted spiral ribbon of resistance wire extending lengthwise through the interior of said tubing and in direct contact with the water flowing therethrough and attached endwise to said plugs, and couplings between the section of the tubing and the water supply and outlet respectively, said couplings having inner cup portions seating said plugs and screwed on said ends to fasten the plugs to the same, and outer neck portions receiving said water supply and outlet respectively.

2. In a water heater, a water conduit made of electrical insulating material, a heating element extending lengthwise therein and comprising a twisted ribbon to provide a longitudinal spiral within said conduit of a width substantially filling the bore of said conduit and creating a rotary advancing path for said water, and a source of electric current connected to the end portions of said heating element, the water being in direct electrical contact with said ribbon.

References Cited in the file of this patent

UNITED STATES PATENTS

| | | |
|---|---|---|
| 1,175,470 | Perkins | Mar. 14, 1916 |
| 1,294,695 | Osterheld | Feb. 18, 1919 |
| 1,403,594 | Duo | Jan. 17, 1922 |
| 2,224,403 | Lines | Dec. 10, 1940 |
| 2,556,440 | Rappl | June 12, 1951 |
| 2,616,022 | Arnaud | Oct. 28, 1952 |
| 2,836,699 | Mullin | May 27, 1958 |

FOREIGN PATENTS

| | | |
|---|---|---|
| 122,288 | Great Britain | Jan. 23, 1919 |
| 85,467 | Austria | Feb. 15, 1921 |
| 422,803 | Great Britain | Jan. 18, 1935 |
| 123,512 | Australia | Feb. 6, 1947 |
| 274,756 | Switzerland | July 2, 1951 |
| 208,974 | Australia | June 24, 1957 |